Oct. 11, 1932.  A. HERZ  1,881,572
COMPENSATING DRIVE MECHANISM FOR GAS METERS
Filed Nov. 11, 1927   2 Sheets-Sheet 1
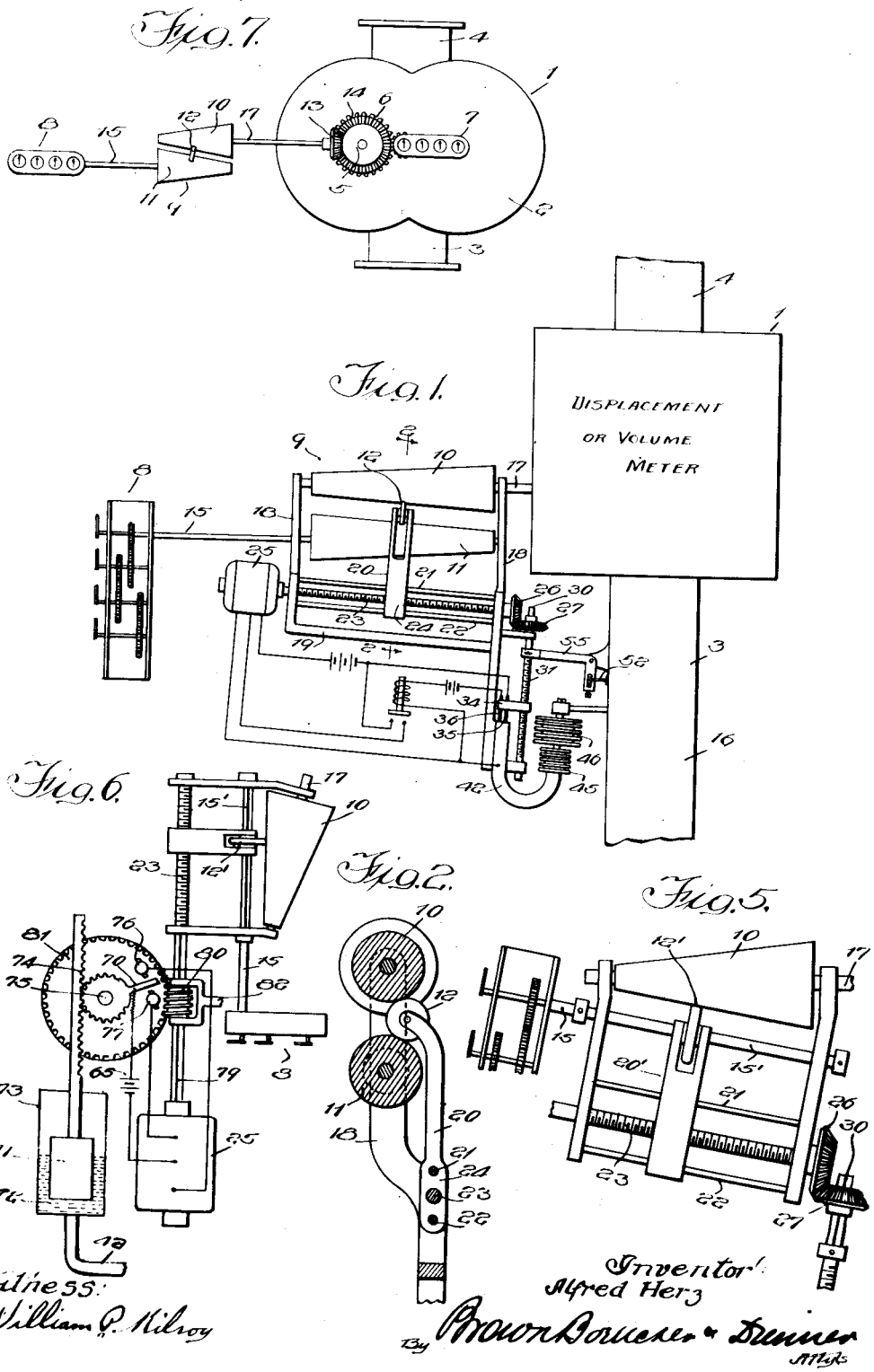
Inventor
Alfred Herz

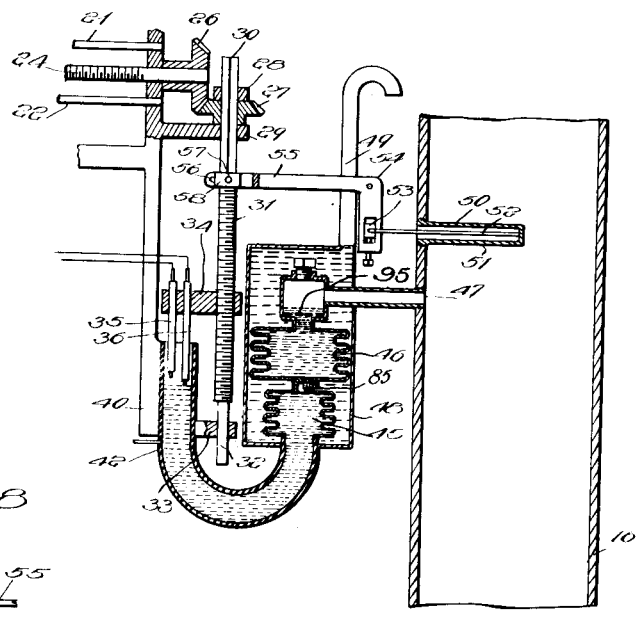

Patented Oct. 11, 1932

1,881,572

UNITED STATES PATENT OFFICE

ALFRED HERZ, OF CHICAGO, ILLINOIS

COMPENSATING DRIVE MECHANISM FOR GAS METERS

Application filed November 11, 1927. Serial No. 232,572.

My invention relates to meters and more particularly to meters for measuring gas flow.

In commercial meters for measuring the flow of illuminating gas, it is customary to measure the gas delivered in terms of displacement, i. e., in cubic feet or the like. This measure is not accurate because the quantity of gas actually delivered may be varied by other factors not taken into account by displacement or volume.

In a perfect gas, according to the laws of Charles and Boyle $$P V = K T$$

where P is in terms of unit pressure, V is volume, T is in terms of absolute temperature, and K is a suitable constant.

Now it may be seen from the above that volume is not to be considered independent of pressure and temperature, otherwise it means nothing, for a gas tends to occupy all space open to it. Therefore, merely to ascertain the volume of gas delivered without reference to temperature and pressure, is not adequate.

I am aware that heretofore gas meters have been devised to take into account all three factors, and I do not claim, broadly, to be the first to measure gas delivery correct for temperature and pressure.

There are, however, numerous gas meters of the pure volume or displacement type now in existence, and I aim to provide an attachment which will make it possible to correct such meters for temperature and pressure. The corrective means which I provide, according to the present invention, need not be constructed as an attachment, but may be built into new meters as a part thereof.

A further element of novelty of my invention resides in the manner in which I combine the temperature and pressure corrections by referring temperature variations to the same means which measures pressure variations. That is to say, since there is a straight line relation between absolute temperature and pressure, I am able by my invention to transform the temperature variations into an action or adjustment corresponding to the action or adjustment caused or controlled by pressure variation.

More specifically by pressure variation I control a contact mechanism and it in turn governs a variable speed transmission between the displacement meter element and the registering mechanism. At the same time I apply the temperature correction directly to said contact mechanism and thereby cause operation of the motor mechanism to control the variable speed transmission just as if the correction were in response to pressure variation. Each adjustment or correction may thus operate independently or they may operate conjointly.

There are other incidental improvements embodied in my invention which will be more apparent from the following detailed description and the accompanying drawings:—

Now in order to acquaint those skilled in the art with the manner of constructing and operating a device embodying my invention, I shall describe in connection with the accompanying drawings a specific embodiment of the same.

In the drawings:—

Fig. 1 is a front elevation, more or less diagrammatic, of a meter embodying my invention;

Fig. 2 is a section on an enlarged scale taken on the line 2—2 of Fig. 1;

Fig. 3 is an enlarged sectional view showing the pressure and temperature responsive elements in section;

Fig. 4 is a diagram of the circuit involved;

Fig. 5 is a fragmentary elevational view of a modification;

Fig. 6 is a diagrammatic view of another modification;

Fig. 7 is an elevational view, largely diagrammatic, illustrating the use of two registers for indicating volume and actual gas delivery, respectively; and Fig. 8 is a fragmentary elevation of a detail.

Referring first to Fig. 7, I have here shown a meter of the volume or displacement type at 1. This meter is preferably constructed with two rotating vanes of involute form and constitutes, in effect, the same construction as is exhibited in the Root or Connersville blower, the two interacting vanes or impellers being housed in a suitable housing 2, said housing having an inlet at 3 and an outlet at 4. One of the impellers has the shaft 5 projecting through the exterior, and this shaft 5 is provided with a driving gear 6 for driving the volume register 7. The parts so far described constitute the usual displacement or volume meter.

According to my invention I provide a second register 8 and drive this from the shaft 5 through a suitable variable ratio transmission 9. This variable ratio transmission in the present instance is shown as comprising two friction cone wheels 10 and 11 connected by an idler 12 which is subject to the control of pressure of gas flowing through the meter and temperature of the gas flowing through the meter, as will be described more in detail. Obviously the specific details herein shown are made by way of example only as there are equivalent devices known to those skilled in the art which may equally well be employed. The cone 10 is driven through a shaft 17, as for example through the bevel gears 13 and 14. The driven cone 11 is connected to a suitable shaft as indicated at 15 for operating the gas delivery register 8.

Referring now to Figs. 1 to 4, I show in detail the manner of controlling the variable ratio transmission 9. The driving cone 10 is connected through shaft 17 to the displacement or volume meter 1 which is connected in the gas delivery pipe 16.

The cones 10 and 11 are supported in suitable side frame members 18 forming a part of the main frame 19. The idler 12 is adapted to be shifted endwise with respect to the cones 10 and 11 by means of a shifter fork 20, this shifter fork being guided on suitable guiding rods 21 and 22 and moved by the lead screw 23 which is threaded through the rear end of the shifter fork 24. The lead screw 23 is journaled in the side frame members and is connected at its left end in Fig. 1 to the reversible electric motor 25, said motor being reversible for the purpose of turning the lead screw either forward or backward to shift the idler 12 to the right or to the left for changing the ratio of the transmission 9.

The idler 12 is preferably faced with relatively yielding friction material and the cones 10 and 11 made of smooth unyielding material. The idler 12 constituting merely a motion transmitting member, that is, an idler, is not required to be of any predetermined diameter and, in fact, through wear its diameter might change without affecting the accuracy of the instrument.

Upon the right hand end of the lead screw 23 I provide a bevel gear wheel 26 which meshes with a cooperating bevel gear wheel 27, the construction of which is shown in detail in Fig. 3. The bevel gear 27 is held against endwise motion between the frame portions 28 and 29. It is broached out square to receive the square shaft 30, which square shaft at its lower end is turned round and threaded as indicated at 31 and provided at its lower end with a slidable bearing portion 32 carried in a bearing 33 on a part of the frame. A suitable threaded follower 34 is carried by the threaded part 31 of the shiftable shaft 30, and a pair of contact members 35 and 36 are supported on said follower 34. The structure of these contact members is shown more in detail in Fig. 4. The contact member 35 comprises a central rod 37 covered by an insulating sleeve 38 which exposes the lower contact portion 39. This lower contact portion 39 is normally out of contact with a body of mercury 40 in the manometer tube 42 by a distance only great enough to maintain a break in the circuit of said contact member 35. The contact member 36 likewise comprises a central rod 41 and an insulating sleeve or coating 43 which extends down to the end of the rod 41. A suitable arc-preventing and protecting liquid may cover the surface of the mercury for example, oil or carbon tetrachloride or the like, indicated by reference numeral 96.

The lower end of the rod 41 is adapted to remain in contact with the mercury body 40 at all times. If the mercury rises it will immediately make contact with the terminal member 39, resulting in an adjustment of the variable ratio driving mechanism 9. Likewise, if the mercury 40 falls below the contact 44, the variable ratio mechanism 9 is adjusted in the opposite direction.

The body of mercury 40 is connected to a metal bellows member 45 and this metal bellows 45 is connected to a second metal bellows 46 of larger superficial area and larger diameter for actuation thereby. The interior of the bellows 46 is connected through a pipe 47 to the interior of the gas delivery main 16 so that the interior of the bellows 46 is subjected to the gas pressure prevailing in the delivery main. The bellows 46 may be filled with a body of liquid, for example, mercury, covered with a layer 95 of some liquid medium which will prevent interaction between the mercury and the gums, tars, resins, and the like in the gas, for example, a glycerine solution may be employed. The bellows 46 may be filled with glycerine if desired. It is not essential that the bellows 46 contain liquid, as it might be left exposed directly to the gas, but I prefer to fill the same with a suitable liquid to prevent the deposit of tars and the like within the same. A nut screw 85 to facilitate filling the bellows 45 is provided at the top of said bellows. Also, instead of the specific forms of bellows 45, 46, shown by way of example, other and well known devices may be used within the teachings of my invention to adapt it to particular conditions, as may be required.

The main 16 is subjected to a pressure normally which stands at about 5 inches of mercury, which pressure varies over a given range, say from 4 to 6 inches of mercury. In the interests of economy and compactness, it is desirable, first, to multiply the variations of pressure occurring in the main 16 and effective to the manometer tube 42 as by means of the bellows 45, 46 of different areas, so that the variations in the mercury column 40 will be amplified in accordance with the different areas of the bellows, and different pressure generated therein in accordance with the teachings of Pascal's laws of confined liquids. Furthermore, it is desirable to balance out a considerable part of the constant value of pressure in order not to require a balancing column of 5 inches in the body of mercury 40 in the manometer tube 42.

This I prefer to accomplish in the following manner: I enclose the bellows 45 and 46 in a casing 48 which may then be filled with a heavy liquid, such as mercury or a heavy oil, and a certain head of mercury or oil be placed on said casing 48 as by means of a stand-pipe 49, and, due to the differences in area of the two bellows members 45 and 46, this constant pressure in the tank 48 will substantially balance the constant value of pressure in the pipe 16, so that only the variations of pressure above or below normal value are imposed on the manometer 40. The tube 42 is preferably made of as small a diameter as is consistent with the use of the contacts 35—36.

The vertical adjustment of the follower 34 with respect to the screw threaded portion 31 of the rod 30 is effected by rotation of the bevel gear 27 when the idler 12 is adjusted to give a ratio corresponding to variations in pressure.

I provide a thermostat 50 subject to the temperature of the gas in the pipe 16 for also controlling the contacts 35—36 to make an adjustment corresponding to variations in temperature. The thermostat 50 comprises a hollow plug member 51 comprising an expansible rod 52, which rod is connected through an adjustable block 53 to one arm of the bell crank lever 54. The long arm 55 of the bell crank lever has a fork 56 connected to the pins 57 to a collar 58 so that the expansion and contraction of the thermostatic rod 52 raises and lowers the entire rod 30 and with it the follower 34 and contacts 35—36 in accordance with the temperature variations.

Referring now to Figs. 1 and 4, it will be seen that if the mercury 40 should drop, contact between it and the contact 44 would be interrupted. Such separation of the contacts interrupts the normally energized circuit of the relay 60 with the result that the contact piece 61 thereof bridges the contacts 62—63 and closes the circuit of the motor 25 through the field 64 and battery 65 in a direction to cause rotation in a clockwise direction, for example, as indicated by the arrow. Since such breaking of contacts 40—44 corresponds to a drop in pressure, the ratio of the transmission 9 should be reduced and the rotation of the motor, as indicated, moves the idler 12 to the left as viewed in Fig. 1, and, at the same time, the lead screw 31 on the shaft 30 lowers the contacts 35—36 until the circuit is reclosed at 40—44, whereupon the relay 60 is energized and the motor circuit interrupted. The motor is preferably provided with suitable means to prevent overrunning, but since such means are well understood by those skilled in the art, and since the specific means forms no essential part of the present invention, such means has been omitted from the drawings to avoid an unnecessary complication thereof.

If the pressure in the main increases, the mercury 40 will rise and close the contact 40—39, resulting in energization of the motor 25 through its field winding 66 to rotate the same in the opposite direction with the result that the idler 12 is moved to the right, as viewed in Fig. 1, and the contact members 35—36 raised to break the circuit.

Variations in temperature vary the general level of the contacts 35—36 with reference to the mercury 40 by shifting the shaft 30 up or down corresponding the expansion or contraction of the thermostatic rod 52.

Obviously, instead of a thermostatic rod, any other suitable thermostatic responsive device may be employed. When the rod 52 expands, due to higher temperature of the gas, the contacts 35—36 are raised, breaking the contact 40—44 and causing an adjustment of the idler 12 to the left corresponding to a lower driving ratio, as would be the case for a decrease in the pressure of the gas.

Obviously, instead of employing two cone wheels 10 and 11, I may employ the cone wheel 10 and a follower 12' slidable on the spur shaft 15' connected through the shaft 15 to the register mechanism 8.

Instead of employing a manometer and a mercury contact, a float or piston operated mechanical contact, such as shown at 70 in Fig. 6, may be employed. In this case, the float 71 is raised or lowered in accordance with the level of liquid 72 in a stand-pipe 73. A rack member 74 cooperates with a meshing pinion 75 to shift the contact 70 between two relatively stationary contacts 76 and 77, these two contacts being connected through reverse fields and the armature of the motor 25, so as to produce a proper direction of rotation of the motor armature for driving the lead screw 23 to shift the follower 12' along the squared shaft 15'. This square shaft 15' in turn is connected to the register 8 for registering the true or corrected measurement of the volume meter which drives the driving cone 10 through driving shaft 17. The lead screw 23 is connected to the shaft 79 of the motor and this shaft carries a worm 80 cooperating with the worm wheel 81 upon which the contact members 76 and 77 are mounted.

If a correction according to temperature is required, the worm 80 may be shifted endwise on the motor shaft 79, to which it is further keyed, by moving the restraining fork or frame 82 in accordance with such temperature variation, in a similar manner as is shown in Figure 3, reference numeral 82 indicating part of a lever as the one shown in Figure 3 and designated there by reference numeral 55. Since the worm 80 has no other duty than driving the worm wheel 81 to move the contacts 76 or 77 out of engagement with the contact 70, its position may readily be controlled by a thermostatic element.

Obviously, the mechanism of my invention may be adapted to other uses than measuring gas delivered, since the two correcting elements may be made to vary in accordance with other variable factors required to be ascertained in making an evaluation of a variable. Thus, for example, liquid flow may be measured by rotating the driving drum or wheel 10 in accordance with rate of flow, varying the position of the contact 70 in proportion to the cross-sectional area of flow e. g., in proportion to the force of the flow by causing said force to act upon the piston 71 and shifting the fork or frame member 82 in proportion to temperature.

There are numerous variations which will occur to those skilled in the art, and I do not intend to be limited to the precise details shown or described.

I claim:—

1. In combination, a conduit for gas flow, a volume meter in said conduit, a register therefor, a variable ratio transmission between the volume meter and the register and having an adjustable element, an electric motor, means controlled by the motor for adjusting said element, a contact mechanism, an electric circuit extending through said mechanism and motor and over which said mechanism controls the motor, a pressure controlled element for governing said contact mechanism to initiate action of the motor, and means controlled by adjustment of the adjustable element to stop the motor.

2. In combination, a conduit for gas flow, a volume meter in said conduit, a register therefor, a variable ratio transmission between said volume meter and said register, a motor, a motor controlled member for adjusting said transmission to control the ratio thereof, a contact mechanism controlled by said motor, pressure responsive means and temperature responsive means both controlling said contact mechanism, and an electric circuit extending through said mechanism and motor and over which the motor is controlled by the mechanism.

3. In a gas meter, a volume meter having a rotatable shaft, a register therefor, a variable ratio transmission between the shaft and the register comprising a friction drive wheel driven by said shaft, a driven follower connected to said register, means for relatively adjusting said wheel and said driven follower to secure a variable driving ratio and including a reversible motor operable to cause relative adjustment of said wheel and follower for varying the driving ratio of said transmission, a pressure sensitive element acted upon by the gas pressure, a supporting means, a movable contact carried by said means and moved by said pressure sensitive element, a pair of contacts cooperating with said movable contact for controlling forward and reverse motion of the motor, an electric circuit over which said contacts control said motor, and means operable by the adjustment of said wheel and follower for moving said cooperating contacts with respect to said movable contact.

4. In a gas meter, a volume meter having a rotatable shaft, a register therefor, a variable ratio transmission between the shaft and the register comprising a friction drive wheel driven by said shaft, a driven follower connected to said register, means for relatively adjusting said wheel and said driven follower to secure a variable driving ratio and including a reversible motor operable to cause relative adjustment of said wheel and follower for varying the driving ratio of said transmission, a pressure sensitive element acted upon by the gas pressure, a supporting means, a movable contact supported by said means and moved by said pressure sensitive element, an electric circuit extending to said motor, a pair of contacts in said circuit cooperating with said movable contact for controlling forward and reverse motion of the motor, and means operable by the adjustment of said wheel and said follower for moving said cooperating contacts with respect to said movable contact, and means subject to the temperature of the gas for moving said cooperating contacts independently of the adjustment of said wheel and follower.

5. In a fluid meter, a first measuring element having a shaft rotatable in accordance with one variable factor of fluid flow, a register, a variable ratio transmission between said shaft and said register, means including a contact controlled by another variable factor of fluid flow, a pair of contacts cooperating with said contact, a circuit through said contacts, a motor included in said circuit and controlled by said contacts, means controlled by said motor for varying the driving ratio of said transmission and for simultaneously moving said pair of contacts to interrupt said circuit, and means controlled by a third variable factor of fluid flow for adjusting the position of said pair of contacts relative to said contact independently of the control of said motor.

6. In a device of the class described, a contact member, a cooperating column of liquid providing a cooperating contact member, means for sustaining the column of liquid, a pair of mechanically connected bellows members of different effective areas, a connection from a source of pressure to one of said bellows, a connection from the other bellows to said column, and means imposing a liquid head upon the outsides of both of said bellows.

7. In a device of the class described, a pair of mechanically connected bellows members of different effective areas, a connection from a source of pressure to the bellows of larger area, a liquid column, means for sustaining the liquid column, a connection from the bellows of smaller effective area to said column, and means imposing a liquid head upon both of said bellows to sustain a substantial part of the pressure imposed upon the inside of said larger bellows.

8. In combination, a friction wheel adapted to be driven, a follower wheel adjustable along the friction wheel, a register adapted to be driven by the follower, a fork for shifting the follower, a lead screw for the fork, a motor for actuating the lead screw to shift the fork, a circuit for said motor, a second lead screw, means for driving said second screw in synchronism with the first, a travelling member operated by the second lead screw, a pair of contacts included in said circuit and controlled by said travelling member, and a movable contact member carried by said means and cooperating with said pair of contact members in said circuit for controlling the operation of the motor.

9. In combination, a friction wheel adapted to be driven, a follower wheel adjustable along the friction wheel, a register adapted to be driven by the follower, a fork for shifting the follower, a lead screw for the fork, a motor for actuating the lead screw to shift the fork, an electrical circuit for said motor, a second lead screw, means for driving said second screw in synchronism with the first, a travelling member operated by the second lead screw, a pair of contacts carried by said member and connected in said circuit, a movable contact in said circuit and arranged to interact with said pair of contacts, a support for said movable contact, and automatic means independent of movement of said motor for adjusting the position of said pair of contacts with respect to said movable contact to thereby regulate their interaction.

10. In combination, a friction wheel adapted to be driven in accordance with fluid flow, a follower wheel adjustable along the friction wheel, a register adapted to be driven by said follower, a fork for shifting the follower, a lead screw for shifting the fork, a motor for driving the lead screw, a circuit for said motor, a second lead screw, means for driving said second screw in synchronism with the first, a travelling member operated by the second lead screw, a pair of contacts carried by said travelling member and connected in said circuit, pressure controlled operating means, a movable contact member in said circuit and controlled by said pressure controlled means in accordance with pressure of the fluid and cooperating with said pair of contact members for controlling the operation of the motor.

11. In combination, a friction wheel adapted to be driven in accordance with fluid flow, a follower wheel adjustable along the friction wheel, a register adapted to be driven by said follower, a fork for shifting the follower, a lead screw for shifting the fork, a motor for driving the lead screw, a circuit for said motor, a second lead screw, means for driving said second screw in synchronism with the first, a travelling member operated by the second lead screw, a pair of contacts connected in said circuit and controlled by said travelling member, pressure controlled operating means, a support, a movable contact member carried by said support and connected in said circuit, said movable contact member being controlled by said pressure controlled operating means in accordance with pressure of the fluid and cooperating with said pair of contact members for controlling the operation of the motor, and means controlled in accordance with temperature of the fluid for shifting the position of said pair of contacts with respect to said movable contact.

12. In combination, a displacement meter, a register therefor, a variable ratio transmission between the meter and the register, a reversible motor, a circuit for said motor, means operated by the motor for varying the ratio of said transmission, operating means controlled by temperature, operating means controlled by pressure, and contact means connected in said circuit and controlled jointly by said temperature controlled means and by said pressure controlled means for governing said motor.

13. In combination, a conduit for gas flow, a volume meter in said conduit, a register therefor, a variable ratio transmission between the meter and the register and having an adjustable element for varying the driving ratio, a motor, a circuit for said motor, means operated by the motor for adjusting said element, a contact mechanism included in said circuit and adapted to control the motor, a temperature controlled element for governing said contact mechanism to initiate action of the motor, and means controlled by adjustment of the adjustable element to control said contacts and to stop the motor.

14. In a fluid meter for integrating three characteristics of passing fluid, a pair of members, means controlled by one of the characteristics to be integrated for moving one of the members, means controlled by the other characteristic for moving the other member, operating means for bringing the members into a predetermined relation to one another, a member movable at a speed which is a function of the third characteristic, a variable ratio transmission driven by said last mentioned member, and means controlled by the extent of movement of said operating means for varying the driving ratio.

15. In a variable fluid meter, the combination of a register, driving means for said register, a movable member controlled by a certain characteristic of said fluid, adjustable operating means interposed between said member and said driving means for determining the speed of said driving means, a motor, a control circuit for the motor, means controlled by the motor for controlling said adjustable operating means, contact mechanism in said circuit for controlling said motor, and variably operable means for variably actuating said contact mechanism in accordance with a plurality of other characteristics of said fluid.

16. In a variable fluid meter, the combination of a register, operating means controlled by a certain characteristic of said fluid, a variable ratio transmission interposed between said register and said operating means, a motor, a control circuit for said motor, means operated by the motor for controlling the ratio transmission, contact mechanism for controlling said motor over said circuit, means for actuating said contact mechanism in accordance with a second characteristic of said fluid, and means for actuating said contact mechanism in accordance with a third characteristic of said fluid.

In witness whereof, I hereunto subscribe my name this 8th day of November, A. D., 1927.

ALFRED HERZ.